United States Patent

[11] 3,583,463

| [72] | Inventors | Kevin B. O'Neil<br>Akron;<br>Paul E. Jr. Helms, Cuyahoga Falls, both of Ohio |
|---|---|---|
| [21] | Appl. No. | 789,027 |
| [22] | Filed | Dec. 31, 1968 |
| [45] | Patented | June 8, 1971 |
| [73] | Assignee | The Goodyear Tire & Rubber Company<br>Akron, |

[54] BIAS-BELTED TIRE CONSTRUCTION
12 Claims, 4 Drawing Figs.

| [52] | U.S. Cl. | 152/361 |
|---|---|---|
| [51] | Int. Cl. | B60c 9/20 |
| [50] | Field of Search | 152/361 |

[56] References Cited
UNITED STATES PATENTS

| 2,541,506 | 2/1951 | Cuthbertson et al. | 152/361 |
| 2,939,502 | 6/1960 | Hindin et al. | 152/361X |
| 3,513,898 | 5/1970 | Lugli et al. | 152/361 |
| 3,426,825 | 2/1969 | Leihee | 152/361 |

*Primary Examiner*—Arthur L. LaPoint
*Assistant Examiner*—Robert Saifer
*Attorneys*—F. W. Brunner and Jack M. Young ABSTRACT: A bias-belted tire having the herein specified tire physical characteristics of rubber compound gauge, rubber compound modulus, and/or rivet, especially when used in a bias-belted tire with fiber glass belt cords, polyester carcass cords, and specified cord angles and relationships. The foregoing abstract is not to be taken as limiting the invention of this application, and in order to understand the full nature and extent of the technical disclosure of this application, reference must be made to the accompanying drawings and the following detailed description.

PATENTED JUN 8 1971

3,583,463

INVENTORS
KEVIN B. O'NEIL
PAUL E. HELMS, JR.
BY Jack M. Young
ATTORNEY

BIAS-BELTED TIRE CONSTRUCTION

BACKGROUND AND SUMMARY OF THE INVENTION

The present invention relates to: (1) pneumatic tires, and to woven fabric usable as a ply in such tire; and relates especially to bias-belted tires; and (2) method of raising modulus in a rubber compound, and the article so made.

A description of the prior art bias angle tires and radial ply tires as they relate to the presently disclosed bias-belted tires has been made in detail in the "Detailed Description of the Preferred Embodiments" hereinafter so that the development of the tire art may be more readily understood by reference to similar components in the drawing by reference numbers.

This invention obtains a superior quality pneumatic tire in a bias-belted tire by combining the desirable features of a bias angle tire and a radial ply tire.

An object of the present invention is to obtain a superior quality pneumatic tire by using a bias-belted tire construction.

Another object of the present invention is to provide a superior quality bias-belted tire having the herein specified tire physical characteristics of rubber compound gauge, rubber compound modulus, and/or rivet.

Another object of the present invention is to provide a superior quality bias-belted tire with fiber glass belt cords, polyester carcass cords, and/or specified cord angles and relations.

Another object of the present invention is to raise modulus in a rubber compound.

Another object of the present invention is to provide a superior quality pneumatic tire having a bias-belted construction with (1) excellent treadwear; (2) improved traction by keeping the tread grooves open; (3) excellent high speed performance and durability; (4) a cool running tire; (5) bruise resistance, ride, stability, handling, cornering, and road holding characteristics; (6) low rolling resistance, etc.

These and other objects of the present invention will become more fully apparent by reference to the appended claims as the following detailed description proceeds in reference to the accompanying drawings.

DETAILED DESCRIPTION OF THE PREFERRED EMBODIMENTS

Figure 1:
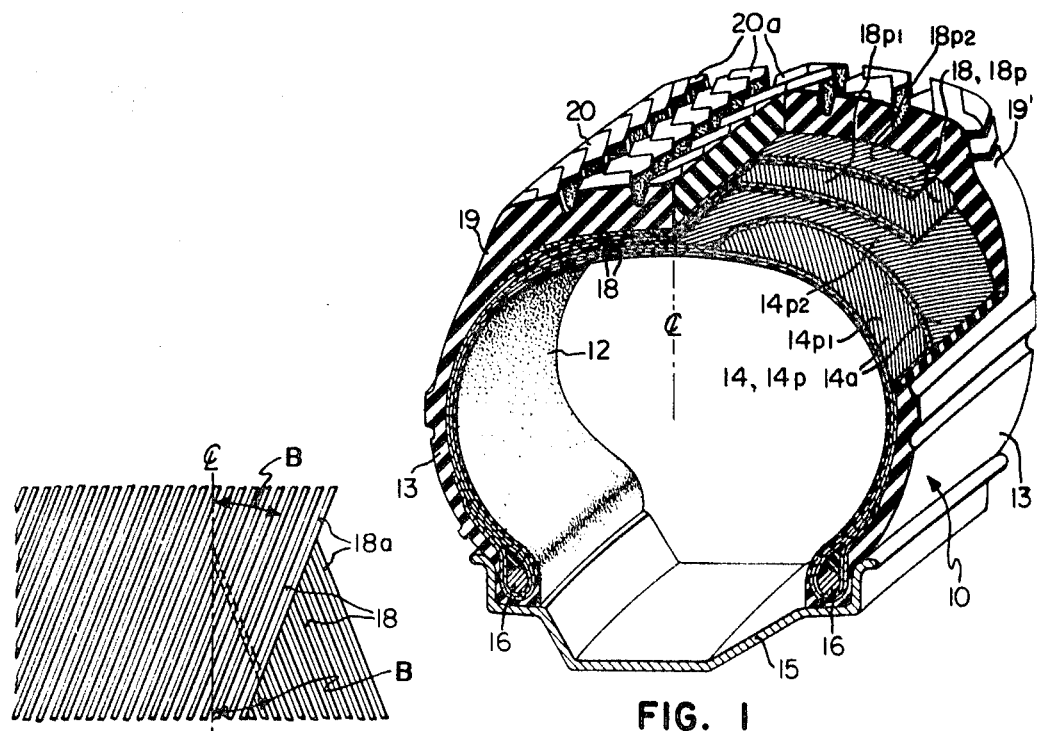
FIG. 1 is a perspective view of a cross section (with parts broken away) of a bias-belted tire of this invention mounted upon a rim and shown in its inflated position.

In FIG. 1, bias-belted pneumatic tire 10 includes internally reinforced carcass 12 including carcass cord layer 14 having a plurality of carcass plies 14p (here shown as two in number as plies or bias ply elements 14p1 and 14p2), which plies are wrapped around inextensible bead members 16 located at wheel rim 15 during use of the tire; and includes circumferential belt 18, comprising a plurality of circumferential belt or breaker plies 18p in carcass 12 beneath tread 20.

Each ply 14p or 18p is made of a rubberized fabric composed respectively of a plurality of parallel tire cords 14a or 18a disposed side by side to form the tire fabric, and coated on each side with a thin layer of rubber carcass stock.

Carcass plies 14p are so arranged that generally parallel carcass cords 14a connect, and extend from, one bead 16 of tire 10 to the other spaced apart bead 16 with cords 14a of respective plies 14p crossed and extending in opposite directions.

A plurality of superimposed breaker or belt plies 18p, bias cut with belt cords 18a of adjacent plies crossed, are positioned in the crown of tire 10, circumferentially around carcass plies 14p, bisected by tire centerline CL, and beneath ground-engaging tire tread 20 having thereon suitable tread elements 20a, such as a pattern of grooves, ridges, etc.

Figure 2:
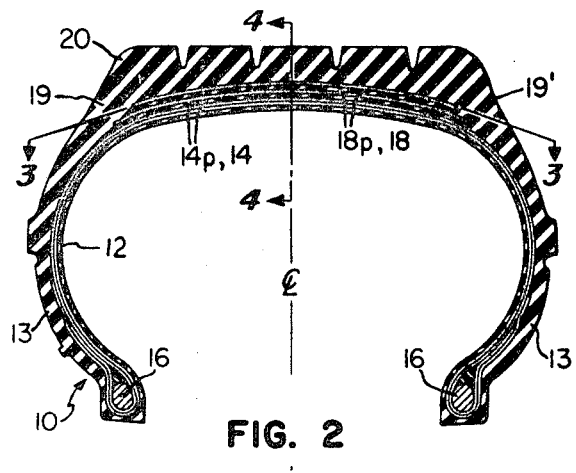
FIG. 2 is a radial, cross-sectional view (with parts broken away) of the tire of the present invention removed from the rim.

After receiving shaped carcass 12 and applied belt 18 and tread 20 on a tire-building machine, tire 10 is cured in a mold in the usual manner. Then, finished bias-belted tire 10 in FIGS. 1 and 2 has carcass 12 with sidewalls 13, bead members 16, shoulders 19 and 19', and tread 20.

Cords 14a and 18a may be made of any suitable filamentary material. For example, cords 14a and 18a of plies 14p and 18p may be made of a synthetic textile material, such as rayon, nylon or polyester. Also, cords 18a in plies 18p may be made of any of the last mentioned synthetic materials; any suitable high modulus and relatively inextensible material, such as, metallic wire, such as steel wire, or (nonmetallic) fiber glass; or any combination of any two or more of these materials, such as in a merged cord.

Tire 10 has been found to have an especially desirable combination of advantages when carcass cords 14a are polyester material and cords 18a are a singles or other type cord of fiber glass filaments (nonmetallic filaments) with each cord being formed of a plurality of extruded, continuous filaments, and especially when the hereinafter mentioned preferred cord angles are used.

The word "cord," as used herein, is used in the terminology of the tire trade when referring to carcass cords 14a, belt cords 18a, cord angle B or C, and cord or cords generically; and the word "cord" thus used is intended to include; (1) in the terminology of the textile trade plied yarn; singles yarn with "O," low, medium, or high twist; a cord or cable made of twisted or plied yarns; etc., and (2) in the terminology of the metal trade wire filament, cord, cable, etc. For example, polyester carcass cords 14a are usually true textile cords, while fiber glass belt cords 18a generally take the form of singles yarn or plied yarn with "0" or low twist so as to take maximum advantage of the characteristics of fiber glass filaments.

A superior quality tire, here called and described as bias-belted tire 10, is obtained by combining the desirable features of a bias angle tire and a radial ply tire.

A bias angle tire has multiple carcass plies of parallel cords placed at opposed angles, and symmetrical with the tire centerline with each ply extending from bead-to-bead through the carcass under the tire tread. These are similar to only two bias carcass plies 14p (with belt 18 omitted) under tread 20 in tire 10 in FIG. 1. This bias angle tire deflects under load in the tire footprint area to behave as a flexible membrane and to assume a smaller radius there as deflected under load with the result that in the footprint area the plies shorten and the cord angles in the plies change. This action also occurs in the tire sidewall and is called pantographing. Pantographing is desirable in the tire sidewall since it gives an improved ride by providing bump and vibration damping properties; but is not desirable in the tread since it distorts the tread elements, wears off tread by a rubbing action with the road, and increases temperature buildup.

A radial ply tire has one or more carcass plies going substantially radially from bead-to-bead with a belt of multiple plies of parallel cords banding the carcass under the tire tread. This belt is similar to belt 18 (without carcass plies 14p) in tire 10 in FIG. 1. This radial ply tire can be visualized as the belt acting like a fixed circumference steel band rolling on the pavement. Its circumference would be the same whether it is circular or is deformed into elliptical or semielliptical shape. Thus, the revolutions per mile are relatively independent of load or inflation pressure. Since the tread area will not pantograph, the fixed circumference hoop (belt) of a radial ply tire gives tread stability resulting in improved traction and tread wear. The sidewalls of a radial ply tire will not pantograph due to its carcass configuration.

Bias-belted tire 10 combines the flexible membrane and fixed circumference hoop type of operation, i.e., maintaining pantographing in the sidewall and eliminating pantographing in the tread. Principles involved in constructing such a tire can be divided into (a) necessary components and (b) degree of restriction. The components to achieve this desired combination necessitates the use of bias angle carcass 12 and belt 18. Bias angle carcass 12 permits pantographing action in the sidewalls 13 to give a good ride by effective vibration and bump damping, and to give sidewall strength and stability. Belt 18 provides an inextensible and incompressible hoop structure which stabilizes or stiffens tread 20 by minimizing pantographing in the tread area to minimize tread element 20a movement and squirm so as to obtain: (1) excellent treadwear; (2) improved traction by keeping the tread grooves 20a open; (3) excellent high speed performance and durability; (4) a cool running tire; (5) good bruise resistance, ride, stability, handling, cornering, and road holding characteristics; (6) low rolling resistance; etc.

The degree of restriction in tire 10 controls the behavior of the tire components. The degree of restriction is dependent on inflated tire characteristics, the relationship of components, and the materials of construction.

As to the inflated tire characteristics, when the tire is inflated to a normal operating pressure, belt 18 will provide a substantial restraint on the carcass 12. This restraint is with respect to the increase, as tire 10 is inflated, of the radial dimensions of carcass 12 as measured at circumferential centerline CL thereof and over a substantial area of carcass 12, extending from centerline CL and laterally of tire tread 20. In other words, if tire 10 were manufactured identically in all respects to bias-belted tire 10, but without belt 18, carcass 12 of such tire would, when the tire was inflated, increase in such radial dimensions by amounts substantially greater than would carcass 12 of tire 10 having belt 18. It will be apparent that in bias-belted tire 10 belt 18 will be required to carry a very substantial portion of the ring stresses present in inflated tire 10.

Figure 3:
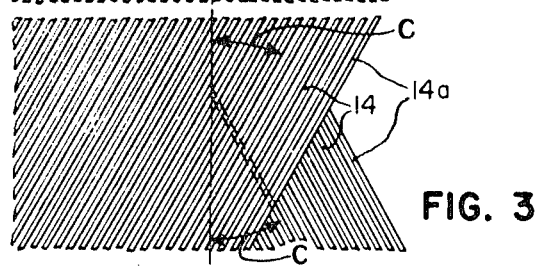
FIG. 3 is a radially inward view taken generally along the line 3–3 of FIG. 2 showing the relationship of the cord angles in the carcass and belt.

The relationship of the tire components is primarily characterized by carcass cord angle C, belt cord angle B and the differential of these angles. Cord angles B and C are measured relative to the equatorial plane containing centerline CL, or relative to this centerline CL. Carcass cord 14a angle C in each carcass ply 14p should be maintained between 25° and 45° and belt cord 18a angle B in each belt ply 18p between 5° and 35° with belt cord 18a angle B even being desirably limited to be between 10° and 30°. In addition, angle C of carcass cords 14a should be at least 5° greater than belt angle B of belt 18. The preferred angle C of carcass cords 14a is 28°— 40° and the preferred belt cord angle B of belt 18 is 18°— 28°. As to belt 18, under 5° belt cord angle C makes a tire difficult to manufacture; under 18° belt cord angle B, the tire is difficult to manufacture for other reasons; and a 18—25° belt cord angle B gives good tire performance, good tread wear, and high separation resistance. The reason for having belt cord angle B lower than carcass cord angle C is to get belt 18 to act as a restrictor on both carcass 12 and tread 20. The natural tendency of the tire is to form a tire shape coordinate with the cord path. The belt cord angle must be less than the carcass cord angle because, as the cord angle goes down, the tire has a flatter tread so belt 18 acts as a restrictor for the crown of tire carcass 12 if belt 18 has a lower cord angle than the rounder shape carcass 12 having higher cord angle C. If belt cord angle B exceeds 35°, the belt 18 is too round in the tire crown under tread 20 and provides insufficient restriction; belt 18 then becomes round like carcass 12 instead of flat like tread 10 so as not to provide the desired restriction. It should be apparent from FIG. 3 that belt cords 18a in adjacent belt plies 18p1 and 18p2 have different cord angles B relative to centerline CL and are oppositely and symmetrically inclined relative to centerline CL. Also, carcass cord 14a angle C in adjacent carcass plies 14p1 and 14p2 are also oppositely and symmetrically inclined relative to tire centerline CL.

The drawings specifically disclose two carcass plies 14p1 and 14p2, hereinafter generically referred to as carcass plies 14p; two belt plies 18p1 and 18p2, hereinafter generically referred to as belt plies 18p; and carcass plies 14p superimposed on each other and surrounded by two superimposed belt plies 18p in bias-belted tire 10. However, it should be readily apparent that this invention relates to all types of bias-belted tires, even though only bias-belted tire 10 is illustrated and described herein as an example. Therefore, when bias-belted tire 10 is referred to herein, the description and drawings are intended to include within their scope all operative variations of the illustrated structure including: (1) in carcass cord layer 14, any suitable number of carcass plies 14p; and (2) in belt 18, any suitable number of belt plies 18p, such as one, two (as shown), three or more belt plies 18p; any number of belt plies 18p arranged above (outside) the carcass plies 14p as shown, or arranged below, between, some between and some above or some below, or sandwiched around (above and below) carcass plies 14p. However, the illustrated two carcass ply 14p and two belt ply 18p construction in bias-belted tire 10 is the preferred construction herein.

Polyester carcass cords 14a and fiber glass belt cords 18a are preferred in bias-belted tire 10 for numerous reasons. Polyester is preferred: (1) over nylon for its high speed impact resistance, better uniformity and stability, low noise level and good treadwear and damping, and no flatspotting; and (2) over rayon for its better strength, uniformity, and durability; softer ride; lower rolling resistance; and better high speed and fatigue characteristics. Fiber glass is a preferred belt cord because of its high impact strength, compression modulus and stiffness; very high dynamic modulus; and low growth and creep.

The degree of restriction and the success of bias-belted tire 10 is dependent on the materials of construction and the relationship of the components, especially of belt 18 and its closely related components, which will be emphasized hereinafter. Belt cords 18a may be composed of continuous filaments of fiber glass; wire; rayon; high modulus nylon, such as Nomex; polyester; or any other suitable filament. Carcass cords 14a may be formed of nylon, rayon, polyester or any other suitable continuous filament.

This description will also treat on criticality of cord angles, rubber compound ply coat, rivet, rubber compound gauges for belt cords 18a, and especially if belt cords 18a be made of continuous fiber glass filaments. This elaborates on the use of: (1) ply coats of specific polymer content, (2) the modulus of the rubber compound on belt cords 18a, (3) minimum rivet (distance or thickness Ta in FIG. 4 between cords 18a), (4) minimum and maximum cured compound gauge of rubber compound as gauge or thickness Tb in FIG. 4 between layers of belt cords 18a, as gauge or thickness Tc between cords 18a in belt ply 18p1 and carcass cords 14a in carcass ply 14p2, and (5) variance of belt cords 18a angle B with respect to carcass cords 14a angle C in tire 10.

"Ply coat" and "cord ply coat" are generically used herein, and are defined, to include skim coat or calendered rubber compound adhesively secured in any well-known manner or otherwise applied to any belt cords 18a and to include any rubber compound cushion or gum strip or layer making up the rubber compound thicknesses Tb, Tc, and Td, and between belt cords 18a in each belt ply 18p1 and 18p2.

When belt cords 18a are preferably made of high modulus material, such as continuous filament fiber glass or wire, it is desirable to get the modulus of the rubber ply coat as high as possible. Fiber glass will be used as a preferred example herein for purposes of illustration. Since the rubber compound normally has a relatively low modulus and fiber glass has a relatively high modulus, the modulus of the ply coat rubber compound should be raised so that it is as close as possible to the modulus of the fiber glass so that this ply coat then will be able to take more shearing, will provide less deformation differential between the fiber glass and the rubber compound of the tire, and will give significantly better separation resistance.

Raising the modulus of the ply coat on cords 18a closes the gap, or tends to close the gap, in the difference of modulus between fiber glass and a conventional rubber component. Even when we tend to close this gap, there is still a substantial difference between the moduli since fiber glass has an extremely high modulus. Closing the gap is desirable from a standpoint of reducing a tendency of the tire components to separate in use, to stiffen the tire structure, to improve treadwear and handling, and to get the moduli of the different tire components as close together as possible in stiffness so that the whole tire acts as a unit, rather than to have low modulus rubber compound bridge the gap between cords 18a for causing discontinuity between cords 18a in belt 18. A higher modulus of the rubber component ply coat will strain the rubber compound adhesive bond to belt cords 18a less if the rubber has a high modulus. However, if the modulus is too high the rubber may become too brittle.

The modulus of the ply coat rubber compound stock should have a cured vulcanizate modulus of not less than 1400 p.s.i. at 300 per cent elongation by standard American Society for Testing and Materials test No. D-412-66 in the "1968 Book of A.S.T.M. Standards" (volume entitled Standard Method of Tension Testing of Vulcanized Rubber). This modulus should desirably be in the range of 1400—3000 p.s.i. The practical range of modulus for passenger tires, defined herein as having not over 40 p.s.i. inflation pressure, is about 1400—2000 p.s.i. with the preferred modulus about 1700 p.s.i. to provide optimum operation and an optimum balance of properties. In contrast, prior art passenger tires normally have a ply coat compound modulus of less than 1300 p.s.i. In a passenger tire, if the ply coat modulus: (1) were too low, it would not be compatible with the fiber glass, and you might get separation at fiber glass cords 18a, or (2) were too high, the rubber compound might be too stiff so as not to be compatible with shearing forces encountered in a passenger tire with relatively low inflation pressure and high flexibility. Moreover, as the load on the tire increases and higher inflation pressures are used, it should be apparent that the tire does not have to be as flexible so that the modulus of the ply coat can be raised, such as in aircraft tires, to 1900—2700 p.s.i.

A suitable ply coat rubber compound stock adhesively secured to and calendered on fiber glass cords 18a (or any other high modulus and relatively inextensible fiber) of each belt ply 18p may consist of any of the following five rubber blends:

1. A blend of 10l —60 per cent polybutadiene, and 90—40 per cent rubbery SBR (styrene-butadiene rubber); or
2. A blend of 10—60 per cent polybutadiene, and 90—40 per cent natural rubber; or
3. A blend of 10—60 per cent polybutadiene, and 90—40 per cent synthetic polyisoprene; or
4. Ethylene, Propylene Diene Monomer (also known as EPDM); or
5. A blend of 30—70 per cent SBR (styrene-butadiene rubber), 70—20 per cent natural rubber, and/or polyisoprene rubber, and 0—30 per cent polybutadiene rubber with sufficient modulus raising component (explained in more detail hereinafter) added to any selected blend to provide to the rubber compound a minimum cured vulcanizate modulus of not less than 1400 p.s.i. and possibly as high as 3000 p.s.i., for the ply coat rubber compound stock at 300 per cent elongation. Although this rubber compound is specifically disclosed herein for use on fiber glass, it can be used with any high modulus fiber, such as steel wire.

Two examples of this modulus raising component are described in more detail hereinafter, and include: (1) SRF carbon blacks, and (2) a mixture of two chemicals disclosed hereinafter, such as resorcinol-hexamethylenetetramine (also called hereafter a modulus raising resin forming component).

When tire 10 containing this modulus raising resin forming component is vulcanized under conditions of heat and pressure for a specified time period, the hereinafter described two chemicals of this component react chemically to form a resin network within the rubber compound as a reinforcing network or backbone in the compound giving the desired modulus to the rubber compound. It has been found that only about 2 parts of this component per 100 parts of rubber hydrocarbon formed by any of the above blends of this modulus raising resin-forming compound need be added to any of the five rubber blends heretofore given to raise the modulus to the desired 1400—1700 p.s.i. level.

A suitable modulus raising resin-forming component is found in a system or compound type, described as an in situ (formed in place) resin system, placed in the uncured rubber blend and reacting to form a resin network within and through the rubber compound during vulcanization. One suitable form of such resin system or modulus raising resin-forming component comprises a mixture of the following two chemicals:

1. Resorcinol, resorcinol-based resin, or other resorcinol-type compounds; or different types of phenolics. Each is a methylene acceptor or an aromatic compound compatible with rubber, and forming the backbone, or the rigid part, of the resin.
2. Any methylene donor, such as hexamethylenetetramine; formaldehyde; hindered amines; triallyl guanidine, etc.

It has been found that at least a 6:1 mol. ratio of resorcinol to hexamethylenetetramine provides a satisfactory resin system for raising the modulus in the desired manner, and this is the preferred modulus raising, resin-forming component. The 1 mol. of hexamethylenetetramine decomposes to release 6 mols. of formaldehyde so that a 1:1 ratio mixture of formaldehyde and resorcinol is obtained.

The desired modulus may sometimes be more readily obtained by also following any of these three methods. First, making the mixture rich in, or have an excess of, formaldehyde will cause the chemical resin-forming reaction to go more completely to completion and will increase the resin-forming action. Using a 2:13:1, 4:1 or 5:1 mol. ratio, instead of a 6:1 mol. ratio, will make the mixture still richer in formaldehyde, which then will be able to bond into the two additional sites on the aromatic resorcinol ring between the OH radicals thereon. A low ratio might even result in a completely cross-linked in situ resin. Second, although some effort has been made to use resorcinol-hexamethylenetetramine to improve tire rubber-to-cord adhesion by using 10 to 14 parts thereof per 100 parts of rubber to increase cord adhesion, it has been found that below 7 parts gives no apparent increase in cord adhesion. Here, we are using substantially less resorcinol-hexamethylenetetramine, 2 to 4 parts, for obtaining the desired raise in modulus. Third, thoroughly mix this modulus raising component into the rubber blend to give more uniform high modulus to the rubber compound. If better cord adhesion is desired, better mixing may not be desirable but location of one of the chemicals may preferably be carried on the cord where adhesion is desired If thorough mixing is used, it should be noted that since heat applied for a period of time will complete the resin-forming action, one of these two modulus raising components may have to be kept out of the rubber blend until after any remaining heat-time mixing, such as in a banbury, will not prematurely complete the resin forming action before final tire curing or vulcanization.

This modulus raising component provides a desired increase in modulus to the rubber compound without decreasing the rubber resiliency or any other desirable rubber property. Even if the modulus is as high as 3000 p.s.i. the ply coat acts effectively as carcass stock and is not too brittle because the in situ resin system tends to reduce the brittleness of the rubber compound. We want this increase in modulus without undesirable increase in hysteresis properties, heat buildup, etc. that we would get if we used conventional carbon blacks to raise the modulus. This permits us to get a higher modulus rubber compound having a modulus closer to the modulus of fiber glass. However, it should be realized that some of the new SRF carbon blacks (semireinforcing furnace blacks) may raise the modulus sufficiently without raising the hysteresis so may also be called a modulus raising component.

It is desirable to have above a certain predetermined minimum thickness of high modulus rubber compound: hereinafter called rivet Ta in FIG. 4 between belt cords 18a in any one belt ply 18p; gauge Tc between belt cords 18a in belt ply ply or belt ply element 18p1 and carcass cords 14a in carcass or bias ply element 14p2; gauge Tb between belt cords 18a in any two adjacent belt plies or bias ply element and 18p2; and guage Td between belt cords 18a in belt ply or belt ply element 18p2 and tread or tread element 20. It is important to insulate one from the other by these thicknesses Ta, Tb, Tc and Td so as to get increased separation resistance, and to absorb more shearing action during relative movement in view of the high modulus fiber glass cords 18a.

It has been found that the minimum cured rivet Ta for fiber glass cords is 0.008 inches while that for more conventional fibers (such as rayon, nylon, or polyester) is 0.004 inches. If merged fibers are used for belt cords 18a, this minimum rivet is the summation of the percentage of each these rivet dimensions with these percentages being the percentages of each material in a merged cord 18a. For example, a merged cord 18a of 75 percent fiber glass and 25 percent rayon has minimum rivet of 0.007 inches (75 percent ×0.008+25 percent ×0.004=0.007). This greater rivet assures that there will be sufficient gauge of rubber compound between adjacent belt cords 18a in any one belt ply 18p for high modulus fiber glass cords 18a so that the shear forces that are set up can be absorbed or dissipated by the rubber compound in the ply coat that separates adjacent cords within the belt component.

The aforedescribed high modulus rubber ply coat has a minimum cured gauge Tb between belt cords 18a in adjacent belt plies 18p1 and 18p2, minimum cured gauge Tc between belt cords 18a in belt ply 18p1 and carcass cords 14a in carcass ply 14p2, and minimum cured gauge Td between bolt cords 18a in belt ply 18p2 and tread 20 have a desirable minimum dimension. It has been found that the minimum cured gauge Tb, Tc or Td is given by the equations:

$$Gc = Tb = Tc = Td$$

$$Gc = 0.62 \left[ \frac{g1 + g2 + \ldots + gn}{2} + k1 + k2 + \ldots + k_n \right].$$

wherein:

$G_c$=minimum cured compound gauge Tb, Tc or Td, as measured at centerline CL of the tire.
$g1$=cord gauge of belt cords 18a in one belt ply 18p1.
$g2$=cord gauge of belt cords 18a in other belt ply 18p2.
$k1$=insulation factor for belt ply 18p1.
$k2$=insulation factor for belt ply 18p2.
$\ldots +k_n$ or $g_n$=corresponding $k$ or $g$ factors for more than two belt plies, and as high as $n$ belt plies. Insulation factor $k$ for rayon; high modulus nylon, such as Nomex; polyester; or other lower modulus filaments in belt cords 18a is 0.010, $k$ for fiber glass, steel wire, and other high modulus filaments in belt cords 18a is 0.015 so that this Gc formula is usable for any material belt, such as rayon, as well as fiber glass.

Figure 4:
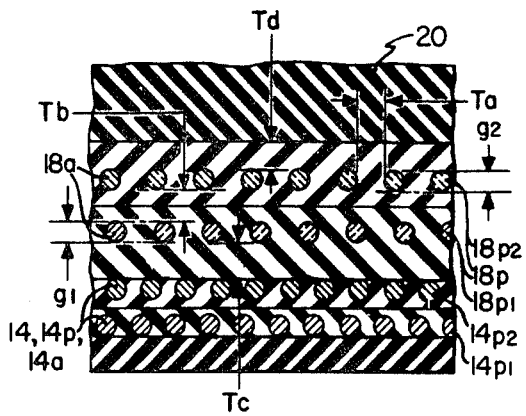
FIG. 4 is a sectional view taken generally along the line 4–4 in FIG. 2 along the centerline of the tire showing the relationship between the component tire parts.

In practice, each belt ply 18p1 or 18p2 has its ply stock composed of this high modulus rubber compound with a gauge $G_C$ on one side and a gauge of $G_{c}/2$ on the other side so that in composite tire 10 of FIG. 4 a gauge of $G_C$ will be found on each side of each layer of tire belt cords 18a.

There are reasons for this minimum gauge Tb, Tc or Td.

Minimum gauge Tb permits one belt ply 18p1 to operate independently of other belt ply 18p2 to permit relative movement therebetween while both belt plies act together as a single belt 18 to provide the restriction action desired.

Minimum gauge Td minimizes relative shear forces to prevent tread 20 from separating from belt ply 18p2 while still keeping the elements of tread 20 as stiff as possible.

Minimum gauge Tc is especially important in isolating or separating the relative movement of carcass cords 14a in carcass 14p2 from belt cords 18a in belt ply 18p1. As tire 10 goes through the footprint (makes contact with the ground), carcass cords 14a pantograph while belt cords 18a restrict tire carcass 12 as belt 18. This action causes a great deal of relative movement between pantographing carcass cords 14a and belt cords 18a in the closest adjacent belt and carcass plies 18p1 and 14p2. A minimum thickness of high modulus material is necessary to absorb the shearing action taking place. The minimum thickness of high modulus material is expressed by the above formula; while the high modulus rubber compound material has been discloses heretofore and is especially adapted to absorb more energy or strain (while undergoing a small deformation) than a lower modulus material since there is more work area for a given elongation under the steeper stress-strain curve of a high modulus material.

The importance of these minimum thicknesses Ta, Tb, Tc and Td, and the high modulus ply coat rubber compound, is that this combination minimizes the chance of separation failure by bringing the modulus of the rubber compound up closer to the high modulus of the fiber glass so that there is less of a deformation differential between them. The thicker the rubber compound stock between these cords, the more the insulation or the isolation, of this relative movement between them.

A brief explanation of separation failure will emphasize the importance of sufficient rubber gauge in high modulus rubber compound material. If either of these is lacking, tremendous shears will build up between belt cords 18a and the rubber compound because large deformations may occur under specific loading. Since the belt has a very low deformation, rupturing of the adhesive bonds and the rubber compound may occur. Actually, small cracks may form in high stress pockets at the edge of belt 18 along the plane of the belt and at an angle thereto in the shoulder 19 and 19' area of tire 10, taken only as an example herein for purposes of explanation, under dynamic stressing, shearing, and inertia force components. These cracks may grow toward the center of the tire and along the edge of the belt to cause ultimately a separation bubble there and ultimate tire failure. These problems become more pronounced when the tire is warmed up because the rubber properties deteriorate, the modulus becomes lower, and the tire becomes weaker. If we maintain the necessary degree of stiffness and minimize deformations so we don't strain the adhesive bond as much, integrity of the tire will be maintained and much better performance will be obtained. Hence, the higher modulus rubber compound and the thicker gauge between the belt components and surrounding components provides physical properties to tire 10 more compatible with belt 18.

$G_c$ maximum should be about 0.1 inch for gauge Tb, Tc, or Td for fiber glass belt cords 18a. If any gauge becomes too great, tire 10 could run into a separation problem from too much rubber bulk or too much heat buildup, especially in shoulder 19 or 19', which is the critical part of the tire because each shoulder is the thickest portion of the tire and generally has the highest heat buildup. Also, the edge of belt 18 is a vulnerable point for separation to initiate or start adjacent shoulder 19 or 19'. Heavy gauges cause heat buildup which degrades rubber compound properties and adhesive properties. Also, the centrifugal force becomes too great there and may lead to separation or rupture from centrifugal, inertia, or other force components. Also, rubber is an excellent insulator, so that once you get heat buildup in the tire carcass, it is difficult to dissipate that heat so that the tire may break down and separation may occur sooner. This maximum thickness $G_c$ of 0.1 inch may be slightly exceeded as we move away from the tire centerline CL toward each shoulder 19 or 19' to allow for the greater pantographing action that occurs but the thickness adjacent shoulder 19 or 19' still should not be substantially larger than the 0.1 inch so as to minimize heat buildup and rubber compound degradation in the shoulder area where separation is first likely to occur.

This invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are, therefore, intended to be embraced therein.

We claim:

1. In a pneumatic tire comprising a pair of beads, a tread, a pair of sidewalls connecting the tread and beads, at least two carcass plies reinforced with cords disposed at similar angles of from about 28° to about 40° measured in opposing directions from the centerline of the tire, and a pair of annular belts for reinforcing the tire in the area of the tread, the improvement which comprises reinforcement cords in the belts disposed at angles, measured from the tire centerline, which are less than corresponding angularly disposed cords in the carcass plies, a minimum gauge of cured rubber material between the cords of adjacent belts measured radially at the centerline of the tire being:

$$0.62 \left( \frac{g^1 + g^2 + \ldots + g^n}{2} + k1 + k2 \ldots + kn \right)$$

wherein:
$g^1$ = cord gauge of belt cords 18a in first belt ply element;
$g^2$ = cord gauge of belt cords in second belt ply element;
$k1$ = insulation factor for first belt ply element;
$k2$ = insulation factor for second belt ply element;
$\ldots + kn$ or $gn$ = corresponding $k$ or $g$ factor of more than two belt plies, and as high as $n$ belt plies; said factor $k$ being 0.01 for cords composed of material selected from the group consisting of rayon, nylon and polyester.

2. The improvement of claim 1, wherein the maximum gauge of cured rubber is not greater than about 0.1 inches.

3. In a pneumatic tire comprising a pair of beads, a tread, a pair of sidewalls connecting the tread and beads, at least two carcass plies reinforced with cords disposed at similar angles of from about 28° to about 40° measured in opposing directions from the centerline of the tire, and a pair of annular belts for reinforcing the tire in the area of the tread, the improvement which comprises reinforcement cords in the belts disposed at angles, measured from the tire centerline, which are less than corresponding angularly disposed cords in the carcass plies, a minimum gauge of cured rubber material between the cords of adjacent belts measured radially at the centerline of the tire being:

$$0.62 \left( \frac{g^1 + g^2 + \ldots + g^n}{2} + k1 + k2 + \ldots + kn \right)$$

wherein:
$g1$ = cord gauge of belt cords 18a in first belt ply element;
$g2$ = cord gauge of belt cords in second belt ply element;
$k1$ = insulation factor for first belt ply element;
$k2$ = insulation factor for second belt ply element;
$\ldots + kn$ or $gn$ = corresponding $k$ or $g$ factor of more than two belt plies, and as high as $n$ belt plies; said factor $k$ being 0.015 for cords composed of material selected from the group consisting of fiberglass and steel wire.

4. The improvement of claim 3, wherein the maximum gauge of cured rubber is not greater than about 0.1 inches.

5. In a pneumatic tire comprising a pair of beads, a tread, a pair of sidewalls connecting the tread and beads, at least two carcass plies reinforced with cords disposed at similar angles of from about 28° to about 40° measured in opposing directions from the centerline of the tire, and a pair of annular belts for reinforcing the tire in the area of the tread, the improvement which comprises reinforcement cords in the belts disposed at angles, measured from the tire centerline, which are less than corresponding angularly disposed cords in the carcass plies, the rubber surrounding the reinforcement cords of the carcass plies consisting essentially of 30—70 percent styrene-butadiene rubber, 70—20 percent natural rubber, and 0—30 percent polybutadiene rubber.

6. The improvement of claim 5, wherein the rubber surrounding the reinforcing cords of the carcass plies includes a modulus raising component comprising resorcinol and hexamethylenetetramine.

7. The improvement of claim 6, wherein the mole ratio of resorcinol to hexamethylenetetramine is less the 6 to 1.

8. The improvement of claim 7, wherein no more than about 4 parts of said modulus raising component are used for every 100 parts of rubber hydrocarbon in said rubber.

9. In a pneumatic tire comprising a pair of beads, a tread, a pair of sidewalls connecting the tread and beads, at least two carcass plies reinforced with cords disposed at similar angles of from about 28° to about 40° measured in opposing directions from the centerline of the tire, and a pair of annular belts for reinforcing the tire in the area of the tread, the improvement which comprises reinforcement cords in the belts disposed at angles, measured from the tire centerline, which are less than corresponding angularly disposed cords in the carcass plies, the rubber surrounding the reinforcement cords of the carcass plies consisting essentially of from 30—70 percent styrene-butadiene rubber, from 70—20 percent polyisoprene rubber, and from 0—30 percent polybutadiene rubber.

10. The improvement of claim 9, wherein the rubber surrounding the reinforcing cords of the carcass plies includes a modulus raising component comprising resorcinol and hexamethylenetetramine.

11. The improvement of claim 10, wherein the mole ratio of resorcinol to hexamethylenetetramine is less than 6 to 1.

12. The improvement of claim 11, wherein no more than about 4 parts of said modulus raising component are used for every 100 parts of rubber hydrocarbon in said rubber.

UNITED STATES PATENT OFFICE
CERTIFICATE OF CORRECTION

Patent No. 3,583,463              Dated June 8, 1971

Inventor(s) Kevin B. O'Neil and Paul E. Helms, Jr

It is certified that error appears in the above-identified patent and that said Letters Patent are hereby corrected as shown below:

Column 5, line 47, should read "1. A blend of 10-60" instead of "A blend of 101-60".

Column 6, line 36, should read "Using a 2:1, 3:1" instead of "Using a 2:13:1".

Column 7, line 7, should read "belt plies or bias ply elements 18p1 and 18p2" instead of -- belt plies or bias ply element and 18p2".

Column 7, line 34, "bolt" should be -- belt --.

Signed and sealed this 16th day of November 1971.

(SEAL)
Attest:

EDWARD M. FLETCHER, JR.      ROBERT GOTTSCHALK
Attesting Officer             Acting Commissioner of Patents